US009762778B2

(12) United States Patent
Glöckler

(10) Patent No.: US 9,762,778 B2
(45) Date of Patent: Sep. 12, 2017

(54) COOLED AERIAL CAMERA

(75) Inventor: Gerd Glöckler, Weidenstetten (DE)

(73) Assignee: LEICA GEOSYSTEMS AG, Heerbrugg (CH)

( * ) Notice: Subject to any disclaimer, the term of this patent is extended or adjusted under 35 U.S.C. 154(b) by 201 days.

(21) Appl. No.: 14/350,772

(22) PCT Filed: Aug. 30, 2012

(86) PCT No.: PCT/EP2012/066823
§ 371 (c)(1),
(2), (4) Date: May 12, 2014

(87) PCT Pub. No.: WO2013/053538
PCT Pub. Date: Apr. 18, 2013

(65) Prior Publication Data
US 2014/0253728 A1 Sep. 11, 2014

(30) Foreign Application Priority Data
Oct. 10, 2011 (DE) ........................ 10 2011 084 200

(51) Int. Cl.
*G03B 17/55* (2006.01)
*H04N 5/225* (2006.01)
*G03B 15/00* (2006.01)

(52) U.S. Cl.
CPC ......... *H04N 5/2252* (2013.01); *G03B 15/006* (2013.01); *G03B 17/55* (2013.01)

(58) Field of Classification Search
CPC .............................. G03B 17/55; H04N 5/2252
See application file for complete search history.

(56) References Cited

U.S. PATENT DOCUMENTS 4,674,704 A 6/1987 Altoz et al.
2007/0194170 A1* 8/2007 Ellison ................... F16M 11/10
244/3.1
(Continued)

FOREIGN PATENT DOCUMENTS

CN 101163200 A 4/2008
DE 101 37 737 B4 5/2005
(Continued)

OTHER PUBLICATIONS

China Office Action in China Application No. 201280049545.0, dated Feb. 16, 2016, 11 pgs.

*Primary Examiner* — Tung Vo
*Assistant Examiner* — Rowina Cattungal
(74) *Attorney, Agent, or Firm* — Maschoff Brennan

(57) ABSTRACT

An aerial camera, includes at least one objective, a number of optoelectronic and/or electronic components, and a housing that includes the at least one objective and the optoelectronic and/or or electronic components. The optoelectronic and/or electronic components are arranged next to one another and/or one above the other in the housing in at least two different planes, in particular planes arranged at least approximately parallel to one another. The housing has at least one cooling device for cooling the optoelectronic and/or electronic components. The cooling device has at least one cooling channel that is integrated in the housing and extends between the at least two different planes having the optoelectronic and/or electronic components. A gaseous fluid flows through the at least one cooling channel for the purpose of cooling, and the at least one cooling channel is completely separated from the gaseous surroundings of the optoelectronic and/or electronic components.

20 Claims, 2 Drawing Sheets

(56) References Cited

U.S. PATENT DOCUMENTS

| | | | |
|---|---|---|---|
| 2008/0055409 A1* | 3/2008 | Mars | G03B 37/02 |
| | | | 348/143 |
| 2008/0089678 A1* | 4/2008 | Suzuki | G03B 17/55 |
| | | | 396/439 |
| 2008/0164316 A1* | 7/2008 | Patel | G06K 7/10 |
| | | | 235/462.43 |
| 2010/0134981 A1 | 6/2010 | Whittum et al. | |
| 2011/0205703 A1* | 8/2011 | Weaver | G03B 15/006 |
| | | | 361/695 |
| 2011/0216504 A1* | 9/2011 | Alm | G08B 13/19619 |
| | | | 361/695 |

FOREIGN PATENT DOCUMENTS

| | | |
|---|---|---|
| EP | 0 667 708 A1 | 8/1995 |
| WO | 2010/052154 A1 | 5/2010 |
| WO | 2011/091060 A1 | 7/2011 |

* cited by examiner

COOLED AERIAL CAMERA

CROSS-REFERENCE TO RELATED APPLICATIONS

This application is a national stage of International Application No. PCT/EP2012/066823 filed Aug. 30, 2012, which claims priority to German Application No. DE 10 2011 084 200.4, filed Oct. 10, 2011. The foregoing applications are incorporated herein by reference.

BACKGROUND

The invention relates to an aerial camera comprising at least one lens, a number of optoelectronic and/or electronic components and comprising a housing.

Printed circuit boards are carriers for electrical and/or electronic components. Printed circuit boards (PCB) are also designated as printed circuit card, circuit board or printed circuit. Printed circuit boards having a multiplicity of electronic components can be present in electrical and/or electronic devices. Said components include, for example, current/voltage converters, ohmic resistors, transistors, diodes and integrated circuits. In this case, the printed circuit boards can also be arranged in a stacked manner or alongside one another in order to be able to better utilize the available structural space.

The electrical and/or electronic components are often isolated from the environment by an encapsulation fitted to the component, as a result of which cooling of the components can be fashioned in a comparatively simple manner, without having to accept any functional impairment of said components. In these cases, the components are often cooled with air which is moved through a housing surrounding the components and between the encapsulated components by means of a fan. The incoming air has a lower temperature in comparison with the heated components, heats up at said components and finally leaves the housing. Cooling of this type is used in the case of computers, for example. Contamination of the electrical components in the housing can typically occur in this case.

Printed circuit boards are increasingly also being equipped with special electrical components which, in particular, can also fulfill an optical function. Examples of these so-called optoelectronic components include, in particular, camera sensors, motion detectors or the like. In order that light or generally radiation of the electromagnetic spectrum can impinge on an optoelectronic component, such components typically have no encapsulation or only an encapsulation that is transparent or extends around the component partially. Depending on the ambient temperature, however, optoelectronic components should likewise be cooled in order to maintain their function. Cooling with a gaseous fluid, such as cooled air, for example, which is moved through between the incompletely encapsulated optoelectronic components, is generally not possible since contamination by dust and/or moisture, for instance, and thus a functional impairment of the optoelectronic components cannot be ruled out in this case. Such optoelectronic components are used in aerial cameras, in particular.

SUMMARY

The invention is based on the object of providing an aerial camera of the type mentioned in the introduction whose electronic and/or optoelectronic components arranged on different planes can be cooled by means of a gaseous fluid and in this case are simultaneously protected from contamination from the environment. By virtue of the fact that the cooling device of the housing has at least one cooling channel integrated in the housing between the at least two different planes having the optoelectronic and/or electronic components, through which at least one cooling channel a gaseous fluid flows for the purpose of cooling and which at least one cooling channel is at least approximately or completely separated, within a tolerance range, from a gaseous environment of the optoelectronic and/or electronic components, the optoelectronic and/or electronic components, in particular at least one optical sensor of the aerial camera, can be conveniently cooled without being contaminated in the process.

The at least two different planes can be formed by at least two printed circuit boards on which the optoelectronic and/or electronic components are arranged. The at least two printed circuit boards can be electrically connected to one another.

In order to prevent contamination of the electronic and/or optoelectronic components, the housing can be largely sealed in relation to a gaseous environment at its top side and/or underside.

The invention can furthermore provide for the optoelectronic and/or electronic components to be directly or indirectly thermally coupled to the housing, in particular to the at least one cooling channel integrated in the housing. The heat dissipation can be additionally improved as a result. A thermally conductive pad, a copper plate, a thermally conductive paste or the like can be used for this purpose.

The optoelectronic components can have at least one optical image sensor.

The gaseous fluid can be conducted through the at least one cooling channel by means of free or forced convection.

BRIEF DESCRIPTION OF THE DRAWINGS

An exemplary embodiment of the invention is described in principle below with reference to the drawing.

In the figures.

DETAILED DESCRIPTION

Figure 1:
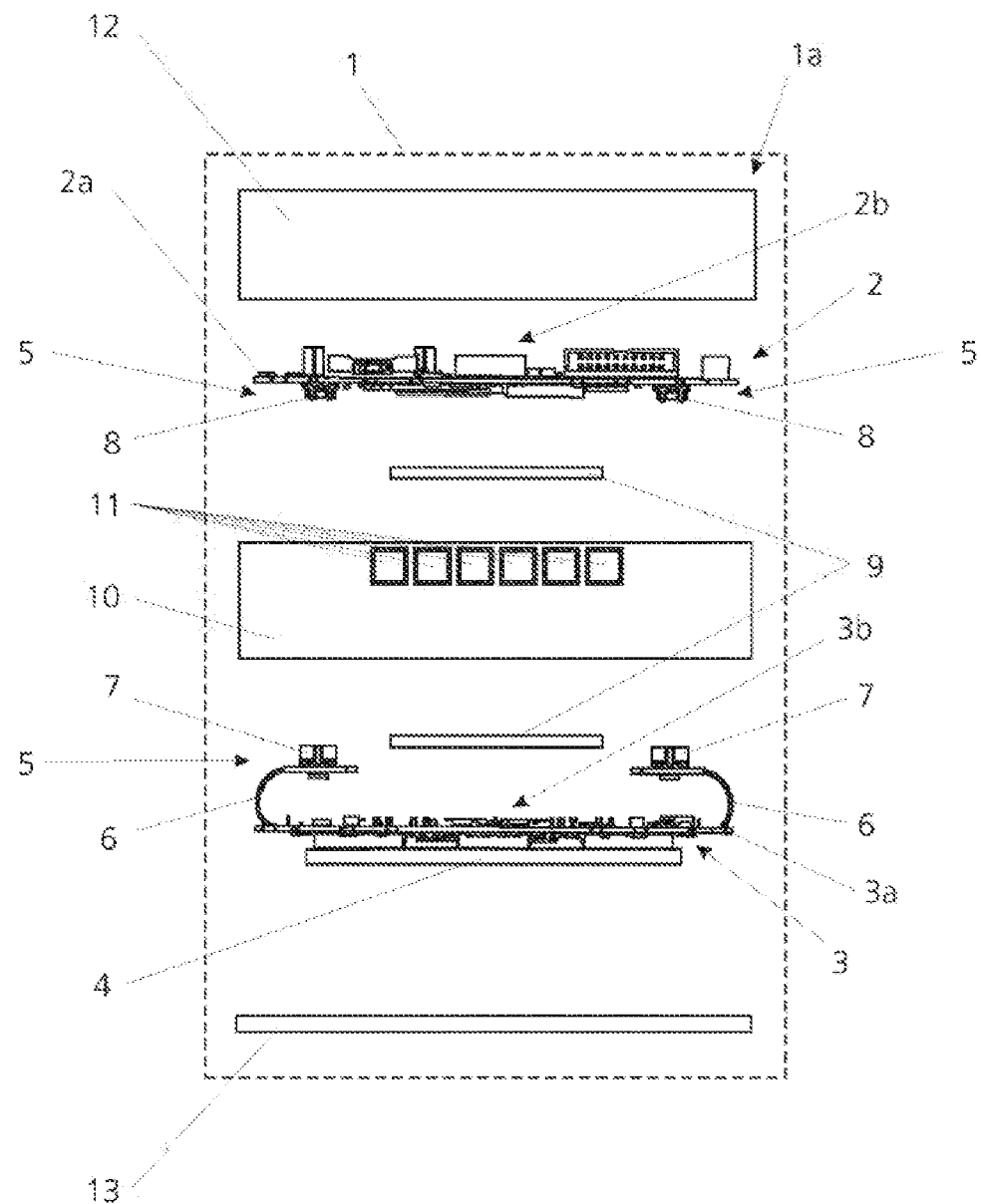
FIG. 1 shows a housing of an aerial camera according to the invention as a simplified exploded illustration.

A housing 1a or a part of a housing 1a of an aerial camera 1, indicated schematically and by dashed lines, is shown as an exploded illustration in FIG. 1. The housing 1a contains, in a first plane 2, a first printed circuit board 2a having optoelectronic and/or electronic components 2b and, in a second plane 3, a second printed circuit board 3a having optoelectronic and/or electronic components 3b, an optical sensor 4, in particular a CCD sensor or CMOS sensor, being mounted on said second printed circuit board. The planes 2 and 3 are different from one another and arranged one above the other in particular at least approximately parallel to one another. In a further exemplary embodiment (not illustrated), the planes can also be arranged alongside one another.

The optical sensor 4 is an optoelectronic component which in this case can fulfill an optical function of an aerial camera. The two printed circuit boards 2a and 3a can be electrically connected to one another. In the exemplary embodiment shown in FIG. 1, the two printed circuit boards 2a and 3a are electrically contact-connected to one another by means of connecting bridges 5 illustrated in a greatly simplified manner, said connecting bridges being arranged respectively at the edge of the printed circuit boards 2a and 3a. Embodiments are also conceivable in which the number of connecting bridges 5 differs from the example shown here. A connecting bridge 5 can be formed by a cable 6, a plug 7 and a socket 8.

The housing 1a has a cooling device 10 for cooling the optoelectronic and/or electronic components 2b, 3b and 4. The cooling device 10 has a plurality of cooling channels 11 integrated in the housing 1 between the two different planes 2, 3 having the optoelectronic and/or electronic components 2b, 3b and 4. A gaseous fluid flows through the integrated cooling channels 11 for the purpose of cooling. The integrated cooling channels 11 are completely separated from a gaseous environment of the optoelectronic and/or electronic components 2b, 3b and 4.

In order that the heat which arises during the operation of the optoelectronic and/or electronic components 2b, 3b and 4 on the two printed circuit boards 2a and 3a can be better dissipated by means of the cooling device 10, the housing 1a has optional thermally conductive components 9 which touch the two printed circuit boards 2a and 3a. The thermally conductive component 9 can be, for example, a thermally conductive pad or a thermally conductive paste.

The housing 1a is largely sealed in relation to a gaseous environment at its top side and/or underside.

The housing 1a is formed at least from the cooling device 10 having a plurality of integrated cooling channels 11 and also a first housing termination 12 and an optical lens 13 of the aerial camera 1 as a second housing termination. In order to ensure that as far as possible no ambient air, which may possibly contain dirt particles, such as dust, for example, comes into contact with the optoelectronic and/or electronic components 2b, 3b, and 4, the cooling channels 11 are integrated in the cooling device 10 in such a way that as far as possible neither ambient air nor the gaseous fluid flowing through the cooling channels 11 comes into contact with the optoelectronic and/or electronic components 2b, 3b and 4. In this case, in particular contamination of the optical sensor 4 by dust or moisture, for example, can largely be avoided. In addition, even further components can be employed for sealing purposes and in order to enable better protection of the optical sensor 4 in particular against dust and moisture (not illustrated).

Figure 2:
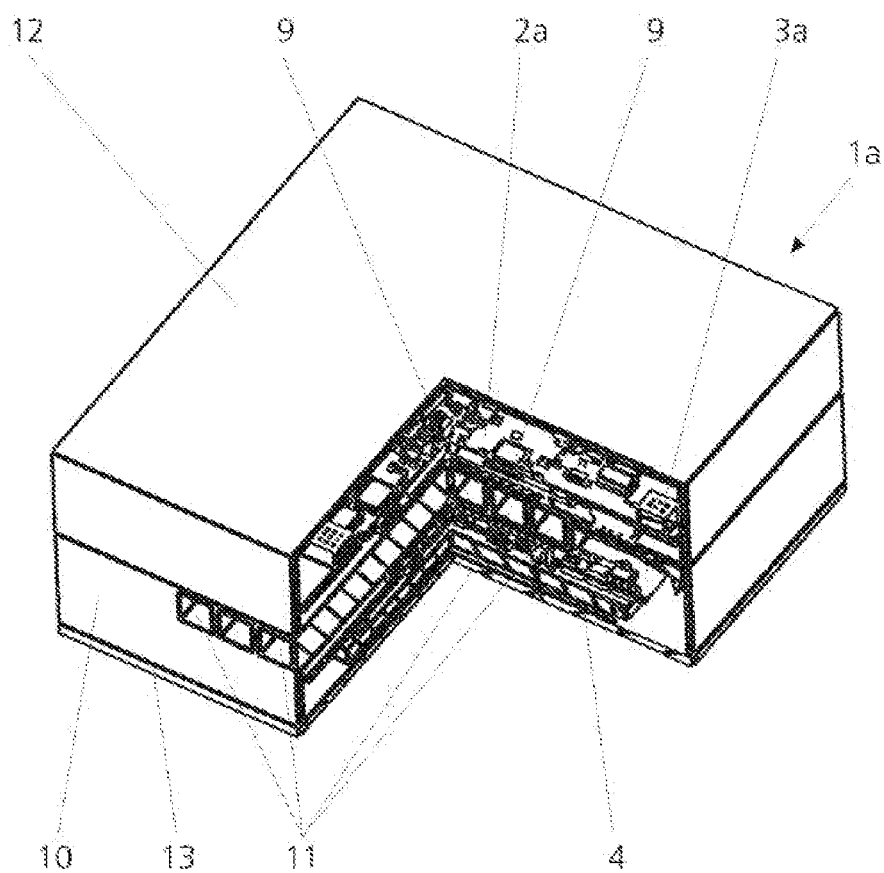
FIG. 2 shows a simplified perspective view of the housing from FIG. 1 in the assembled state.

FIG. 2 shows the housing 1a in the assembled state in a perspective illustration. The course of the cooling channels 11 and the thermal contacting of the two printed circuit boards 2a and 3a with the cooling channels 11 via the thermally conductive components 9 can be discerned.

Furthermore, an external cooling circuit can be provided, having e.g. pipes, a heat exchanger and a fan or the like. The heat exchanger in combination with the fan can form a heat sink of the entire cooling circuit. The gaseous fluid flows through the cooling circuit, and in particular through the pipes, the heat exchanger and the cooling channels, by free or by forced convection. In order to transmit if possible no mechanical movements, such as e.g. vibrations and impacts, from the external cooling circuit to the housing 1a, damping elements can be present between the pipes and the housing 1a (not illustrated).

LIST OF REFERENCE SIGNS

1 Aerial camera
1a housing
2 First plane
2a Printed circuit board
2b Optoelectronic and/or electronic components
3 Second plane
3a Printed circuit board
3b Optoelectronic and/or electronic components
4 Optical sensor
5 Connecting bridge
6 Cable
7 Plug
8 Socket
9 Thermally conductive component
10 Cooling device
11 Cooling channels
12 First housing termination
13 Lens

The invention claimed is:

1. An aerial camera comprising:
at least one lens;
a number of optoelectronic and/or electronic components and
a housing, which has the at least one lens and the optoelectronic and/or electronic components,
wherein:
the optoelectronic and/or electronic components are arranged in the housing alongside one another and/or one above another in at least two different planes;
the housing has at least one cooling device for cooling the optoelectronic and/or electronic components; and
the cooling device has a plurality of cooling channels integrated in the housing between the at least two different planes having the optoelectronic and/or electronic components, through which plurality of cooling channels a gaseous fluid flows for the purpose of cooling and which the plurality of cooling channels are each completely and fluidly separated from a gaseous environment of the optoelectronic and/or electronic components and the plurality of cooling channels are each completely and fluidly separated from each other, each cooling channel having a side adjacent to a first plane of the at least two different planes and a side adjacent to a second plane of the at least two different planes.

2. The aerial camera as claimed in claim 1, wherein:
the at least two different planes are formed by at least two printed circuit boards on which the optoelectronic and/or electronic components are arranged; and
the plurality of cooling channels are arranged in a plane between the at least two different planes.

3. The aerial camera as claimed in claim 2, wherein:
the at least two printed circuit boards are electrically connected to one another.

4. The aerial camera as claimed in claim 1, wherein:
the housing is sealed in relation to an external gaseous environment at a side having a lens of the at least one lens.

5. The aerial camera as claimed in claim 1, wherein:
the optoelectronic and/or electronic components are directly or indirectly thermally coupled to the housing.

6. The aerial camera as claimed in claim 5, wherein:
the optoelectronic and/or electronic components are directly thermally coupled to the plurality of cooling channels integrated in the housing.

7. The aerial camera as claimed in claim 1, wherein:
one of the at least two different planes includes the optoelectronic components that include at least one optical image sensor.

8. The aerial camera as claimed in claim 7, wherein at least one optical image sensor faces a first lens of the at least one lens.

9. The aerial camera as claimed in claim 8, wherein a side of the housing includes the first lens.

10. The aerial camera as claimed in claim 9, wherein the first lens forms the side of the housing.

11. The aerial camera as claimed in claim 1, wherein:
the gaseous fluid is conducted through the at least one cooling channel by means of free or forced convection.

12. The aerial camera as claimed in claim 1, wherein:
the optoelectronic and/or electronic components are arranged in the housing one above another in at least two different planes arranged at least approximately parallel to one another with the plurality of cooling channels there between.

13. The aerial camera as claimed in claim 1, wherein the at least one lens and the optoelectronic and/or electronic components are located within an internal chamber of the housing.

14. The aerial camera as claimed in claim 1, wherein the plurality of cooling channels are arranged in a plane with each other.

15. The aerial camera as claimed in claim 1, comprising a fan for the flowing of the gaseous fluid through at least one of the plurality of cooling channels.

16. An aerial camera comprising:
a lens;
a number of optoelectronic and/or electronic components and
a housing, which has the lens as a wall thereof and the optoelectronic and/or electronic components included within the housing,
wherein:
the optoelectronic and/or electronic components are arranged in the housing alongside one another and/or one above another in at least two different planes, wherein at least one plane includes an optical image sensor that faces the lens;
the housing has at least one cooling device for cooling the optoelectronic and/or electronic components; and
the cooling device has a plurality of cooling channels integrated in the housing between the at least two different planes having the optoelectronic and/or electronic components, through which at least one cooling channel a gaseous fluid flows for the purpose of cooling and which at least one cooling channel is completely and fluidly separated from a gaseous environment of the optoelectronic and/or electronic components and the plurality of cooling channels are each completely and fluidly separated from each other, each cooling channel having a side adjacent to a first plane of the at least two different planes and a side adjacent to a second plane of the at least two different planes.

17. The aerial camera as claimed in claim 16, wherein the plane having the optical image sensor is parallel with the lens.

18. An aerial camera comprising:
at least one lens;
a number of optoelectronic and/or electronic components and
a housing, which has the at least one lens and the optoelectronic and/or electronic components,
wherein:
the optoelectronic and/or electronic components are arranged in the housing alongside one another and/or one above another in at least two different planes, wherein one of the optoelectronic components is an optical image sensor facing the at least one lens;
the housing has at least one cooling device for cooling the optoelectronic and/or electronic components; and
the cooling device has a plurality of cooling channels integrated in the housing between the at least two different planes having the optoelectronic and/or electronic components, through which at least one cooling channel a gaseous fluid flows for the purpose of cooling and which at least one cooling channel is completely and fluidly separated from a gaseous environment of the optoelectronic and/or electronic components and the plurality of cooling channels are each completely and fluidly separated from each other, each cooling channel having a side adjacent to a first plane of the at least two different planes and a side adjacent to a second plane of the at least two different planes.

19. The aerial camera as claimed in claim 18, wherein the housing includes a first lens of the at least one lens as a side of the housing.

20. The camera as claimed in claim 19, wherein the first lens is parallel with the optical image sensor.

* * * * *

UNITED STATES PATENT AND TRADEMARK OFFICE
CERTIFICATE OF CORRECTION

PATENT NO. : 9,762,778 B2  
APPLICATION NO. : 14/350772  
DATED : September 12, 2017  
INVENTOR(S) : Glöckler Page 1 of 1

It is certified that error appears in the above-identified patent and that said Letters Patent is hereby corrected as shown below:

In the Specification

In Column 2, Line 39, delete "drawing." and insert -- drawings. --, therefor.

In Column 3, Line 10, delete "housing 1" and insert -- housing 1a --, therefor.

In Column 3, Line 65, delete "housing" and insert -- Housing --, therefor.

In the Claims

In Column 4, Line 20, in Claim 1, delete "components" and insert -- components; --, therefor.

In Column 5, Line 29, in Claim 16, delete "components" and insert -- components; --, therefor.

In Column 6, Line 15, in Claim 18, delete "components" and insert -- components; --, therefor.

In Column 6, Line 44, in Claim 20, delete "The camera" and insert -- The aerial camera --, therefor.

Signed and Sealed this
Eighteenth Day of September, 2018

Andrei Iancu
*Director of the United States Patent and Trademark Office*